(12) United States Patent
Sheri et al.

(10) Patent No.: US 11,182,891 B2
(45) Date of Patent: Nov. 23, 2021

(54) ASSISTED CORROSION AND EROSION RECOGNITION

(71) Applicant: Baker Hughes Oilfield Operations LLC, Houston, TX (US)

(72) Inventors: George Sheri, Bangalore (IN); Joris Vochten, Berchem (BE); Rasindh K K, Bangalore (IN)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 146 days.

(21) Appl. No.: 16/548,473

(22) Filed: Aug. 22, 2019

(65) Prior Publication Data
US 2021/0055100 A1 Feb. 25, 2021

(51) Int. Cl.
G06T 7/00 (2017.01)
G06T 7/60 (2017.01)
(52) U.S. Cl.
CPC ............ *G06T 7/0006* (2013.01); *G06T 7/001* (2013.01); *G06T 7/60* (2013.01); *G06T 2207/10116* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 2006/0058974 A1* | 3/2006 | Lasiuk | G01B 15/025 |
| | | | 702/97 |
| 2021/0018426 A1* | 1/2021 | Amer | G06N 3/0418 |

\* cited by examiner

*Primary Examiner* — Justin P. Misleh
(74) *Attorney, Agent, or Firm* — Mintz Levin Cohn Ferris Glovsky and Popeo, PC; Lisa Adams

(57) ABSTRACT

Systems, methods, and computer readable medium are provided for determining a wall loss measurement associated with corrosion and/or erosion present within an insulated pipe. A calibration image is acquired for the pipe wall at a first location and used in conjunction with an inspection image acquired for the pipe wall at a second location to determine an inspection thickness of the pope wall. An amount of wall loss measurement can be determined based on a difference of a calibration thickness for the pipe wall at the first location and the inspection thickness of the pipe wall at the second location. The wall loss measurement characterizing an amount of wall material lost due to corrosion and/or erosion present in the pipe wall at the second location. The wall loss measurement can be output for further processing and/or display.

24 Claims, 10 Drawing Sheets

ASSISTED CORROSION AND EROSION RECOGNITION

BACKGROUND

Operational pipelines, such as those used in oil and gas production environments, can include pipes covered in an insulated material. The pipes can be constructed from metals such as steel, carbon steel, cast iron, or ferrous metal alloys which can erode or corrode over time causing structural deficiencies and introducing risks to the safe, efficient operation of the pipes and the pipeline in which they may be configured. The indirect and direct costs of pipe corrosion and/or erosion are estimated to be in the billions of dollars annually across a wide range of industries including drinking water and sewer systems, motor vehicles, defense, transportation infrastructure, oil and gas distribution/transmission/production, electrical utilities, pulp and paper manufacturing, and electrical utilities. Efficiently inspecting insulated pipes to accurately determine and monitor corrosion and/or erosion within the pipes is an important requirement within these industries.

Digital radiography is a form of X-ray imaging employing digital X-ray sensors in place of traditional photographic film. Digital radiography enables images to be captured and processed more rapidly without requiring chemical processing of the films used in traditional X-ray imaging. In addition, digital radiography enables the digitally captured X-ray data to be efficiently transferred and enhanced as digital images. In this way, digital radiography provides immediate availability of the X-ray data and can allow for special image processing techniques to be applied in a variety of practical applications, such as corrosion and/or erosion monitoring in insulated pipes.

SUMMARY

In one aspect, methods are provided. In one embodiment, the method can include acquiring a calibration image of a pipe wall at a first location of an insulated pipe. The method can also include acquiring an inspection image of the pipe wall at a second location. The second location different than the first location. The method can include determining an inspection thickness of the pipe wall at the second location. The method can further include determining a wall loss measurement of the pipe wall at the second location. The wall loss measurement determined based on a difference of a calibration thickness of the pipe wall at the first location and the determined inspection thickness. The wall loss measurement characterizing an amount of wall loss in the insulated pipe at the second location. The method can also include outputting the wall loss measurement.

Non-transitory computer program products (i.e., physically embodied computer program products) are also described that store instructions, which when executed by one or more data processors of one or more computing systems, causes at least one data processor to perform operations described herein. Similarly, systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
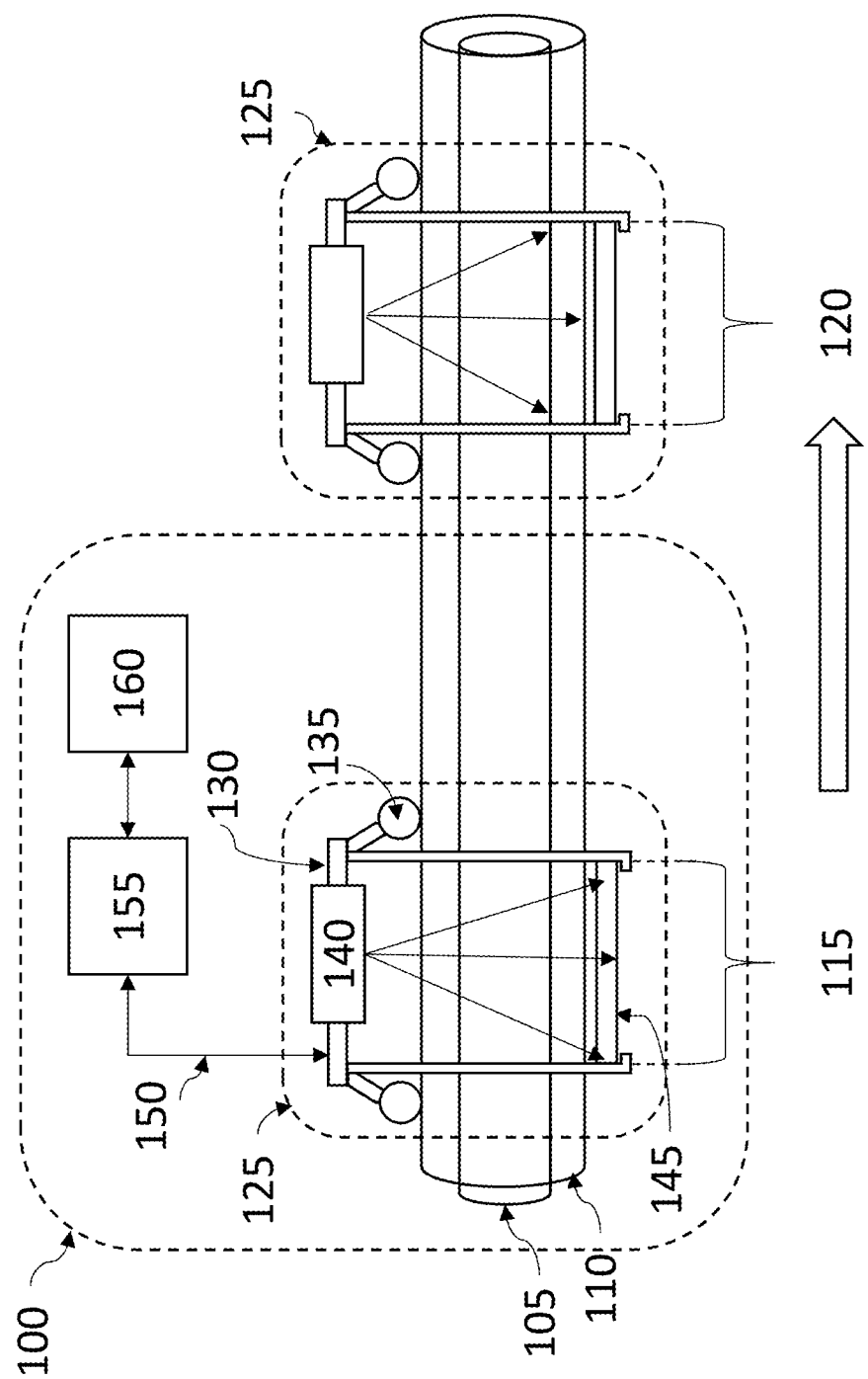
FIG. 1 depicts a system diagram illustrating a corrosion and erosion monitoring system.

Determining corrosion and/or erosion under insulation (CUI) is important in many industrial domains to maintain safe and efficient transport of products within insulated pipes configured to transport the product. Corrosion and/or erosion can occur at many places along the interior surface of a pipe and can be difficult to inspect when pipes are covered in an insulated material or other similar form of insulation. Corrosion is an electro-chemical process resulting in deterioration of the pipe material and the production of rust on the pipe, thereby making the corrosion self-evident. Erosion is a mechanical process that results in deterioration of the pipe material by physically moving pipe material from one location to another. Traditional methods of pipe inspection and corrosion and/or erosion monitoring, such as ultrasonic techniques, require removal of the insulation prior to inspection due to the poor attenuation characteristics of ultrasonic energy penetrating the pipe insulation and the pipe wall. Insulation removal can increase the cost and logistical complexity of corrosion and/or erosion inspections as well as routine maintenance activities and can thereby by increase the overall operating costs of the pipeline in which the insulated, corroded pipes are configured.

Efficiently inspecting insulated pipes for CUI can be desirable for pipe owner/operators as corrosion and/or erosion may be present in one location of pipe but not in another. The ability to assess an amount of corrosion and/or erosion, such as an amount of material that has been corroded away from an inner surface of a pipe wall at a particular location, can be a requirement when performing inspections. Some traditional corrosion and erosion monitoring and/or inspection systems only provide inspection capabilities at a single location and require the inspection system to be repeatedly re-deployed and reconfigured at multiple locations so that a comprehensive assessment of corrosion and/or erosion can be generated for an entire length of insulated pipe. While monitoring and inspection systems may be removed from a pipe and re-installed periodically, such as when transitioning to a new section of pipe, and/or when a path along a pipe is blocked by a supporting member or the like, ideally, an improved corrosion monitoring system would enable inspections could be conducted in a linear fashion along the length of an insulated pipe without having to remove and reconfigure the inspection system/apparatus.

As described herein, an improved corrosion and erosion monitoring system can be configured to inspect an insulated pipe or portions of pipe to determine an amount of material loss occurring at one or more locations along the length of the pipe. The improved corrosion and erosion monitoring system uses digital radiography to effectively distinguish pipe insulation from the pipe wall in order to accurately determine locations of the pipe where material has been lost to erosion or corrosion. The improved corrosion and erosion monitoring system can travel along the length of an insulated pipe and perform inspections at multiple locations without requiring inspection personnel to remove and reposition the system from the insulated pipe. In this way, pipeline operators can deploy the improved corrosion and erosion monitoring system onto an insulated pipe at a first location to calibrate the system and can navigate the inspection system to a second location without having to physically remove the inspection system from the pipe and without having to remove the insulation from the pipe in order to perform an inspection of the pipe for corrosion and/or erosion. As a result, maintenance and repair costs can be decreased compared to traditional systems and methods used for corrosion and/or erosion monitoring and inspection.

FIG. 1 is a system diagram illustrating a corrosion and erosion monitoring system 100 configured to determine an amount of wall loss within an insulated pipe or on the outside of the pipe without requiring the insulation to be removed. As shown in FIG. 1, the corrosion and erosion monitoring system 100 is configured in relation to a portion of a pipe 105. The pipe 105 is covered by a layer of insulation 110 to form an insulated pipe. The insulated pipe can include one or more couplings, joints, fittings, valves, or other mechanisms used to link or couple one or more sections of pipe together. The pipe 105 can include a range of outer diameters between 1.0" and 10.0", for example in some embodiments, the outer diameter of the pipe can be 1.0-2.5", 2.0-4.5", 4.0"-6.5", 6.0"-8.5", and/or 8.0-10.0". The pipe 105 can include a variety of inner diameters that may be appropriately sized depending on the outer diameter of the pipe 105, the product being conveyed within the pipe 105, as well as the industrial application in which the pipe 105 is configured to operate. The pipe 105 can include metal pipes, such as pipes constructed from carbon steel. The insulation layer 110 can include a range of thicknesses. For example, the insulation layer can be 0.5"-1.0", 0.75"-2.0", 1.5"-3.0", and/or 3.5"-6.0" thick. The insulation 110 can include calcium silicate insulation, mineral wool, glass wool, rigid foam, polyethylene insulation, or the like.

The corrosion and erosion monitoring system 100 can be positioned with respect to a first location 115 along the length of the pipe 110 for calibration and then can travel along the length of the pipe 105 to a second location 120 for inspection without having to be physically removed from the pipe 105 and redeployed in the second location 120 to perform corrosion and/or erosion inspection at the second location 120.

As shown in FIG. 1, the corrosion and erosion monitoring system 100 can include a modular acquisition system 125. The modular acquisition system 125 incudes a crawler device 130 which can be configured with a processor, a controller, and a plurality of positioning mechanisms 135. The modular acquisition system 125 also includes a radiographic source 140 and a radiographic detector 145. The modular acquisition system 125 can be coupled via a communications interface 150 to a management system 155 including a display 160.

The modular acquisition system 125 can be configured to receive one or more modular components for use in determining CUI. For example, a variety of different configurations of crawler devices 130, radiographic sources 140, and radiographic detectors 145 can be included in the modular acquisition system 125 depending on the inspection being performed and/or the dimensions or type of pipe being inspected. The various components of the modular acquisition system 125 can be interchangeably reconfigured without deviating from the methods of operations described herein.

The modular acquisitions system 125, as shown in FIG. 1, includes a crawler device 130. The crawler device 130 can include a processor, a controller, and/or a memory. The memory can store computer-readable, executable instructions, which when executed by the processor can cause the controller to operate the crawler device, the radiographic source 140, and/or the radiographic detector 145 according to the methods of operation that will be further described herein. The crawler device 130 can include a rigid, configurable frame or similar mechanisms to provide support for the components of the crawler device 130 so that they can be arranged in relation to the insulated pipe 105. The crawler device 130 includes a plurality of positioning mechanism 135 which can be controlled by the controller and are operable to move, or otherwise position the modular acquisition system 125 along an axial or circumferential aspect of the insulated pipe. For example, the positioning mechanism 135 can include wheels, rollers, calipers, tracks, or the like which can operate to move the modular acquisition system 125 along the outside of the insulated pipe so that inspections can be performed at one or more locations along the length and the circumference of the pipe without having to remove the insulation 110 from the pipe 105. The positioning mechanisms 135 can be further configured to enable the modular acquisition system 125 to travel along the insulated pipe at varying rates of speed. In some embodiments, the positioning mechanisms 135 can be configured to enable the modular acquisition system 125 to travel at a rate of at least 60 feet/hour. In some embodiments, the modular acquisition system 125 can include a global positioning system configured to generate global positioning system coordinate data such that the coordinate data can be included in any digital images of the insulated pipe. In this way, the corrosion monitoring system 100 can accurately determine one or more locations, relative to the insulated pipe, in order to perform calibration and/or inspection operations at the one or more locations.

As further shown in FIG. 1, the modular acquisition system 125 includes a radiographic source 140. The radiographic source 140 can include devices or mechanisms capable of generating and transmitting X-rays, and/or X-ray photons. In some embodiments, the radiographic source 140 can be configured to generate and transmit gamma rays. The radiation emitted from the radiographic source 140 is transmitted through the insulation 110 and the pipe 105 and is received by the radiographic detector 145. The radiographic detector 145 can include indirect flat panel detectors and direct flat panel detectors which can be configured opposite from the radiographic source 140 to receive the emitted radiation and generate a digital image corresponding to the insulation 110 and the pipe 105. The digital image can then be output from the modular acquisition system 125 to determine a measure of CUI occurring within the pipe 105. In some embodiments, the radiographic detector 145 can output the digital image via a wireless communication mechanism configured within the radiographic detector 145.

The modular acquisition system 125 can be operably connected to the management system 155 via a communications interface 150. In some embodiments, the communications interface 150 include a wired communications interface 150. In some embodiments, the communications interface can include a wireless commutations interface 150.

As further shown in FIG. 1, the modular acquisition system 125 is coupled via the communications interface 150 to a management system 155. The management system 155 can include a processor and a memory and can be coupled to a display, such as display 160. The memory can store computer-readable, executable instructions, which when executed, cause the processor to receive the digital image from the modular acquisition system and to process the digital image to determine an amount of corrosion and/or erosion present under the insulation 110 within the pipe 105. The management system 155 can also include one or more software applications which include visualization and repair functionality associated with one or more pipes 105 for which an amount of corrosion, erosion, and/or material loss from a wall of the pipe 105 has been determined. In some embodiments, the management system 155 can also include software functionality associated with calibrating and/or positioning the corrosion and erosion monitoring system 100 and/or the modular acquisition system 125 with respect to an insulated pipe. The management system 155 can be configured to output data pertaining to calibration or inspection operations performed using the corrosion and erosion monitoring system 100 to the display 160. For example, in some embodiments, the management system 155 can provide data pertaining to inspected sections of the insulated pipe 105 as overlays in a three-dimensional computer-aided design (CAD) model of the insulated pipe 105. In some embodiments, the management system 155 can include software functionality configured to cause the modular acquisition system 125 to perform calibration and inspection operations in an automated manner at one or more locations along the insulated pipe 105. The management system 155 can also include software functionality configured to cause the display 160 to auto-generate calibration and/or inspection data, such auto-generating a color map for each digital image of the insulated pipe 105 captured by the modular acquisition system 125.

Figure 2:
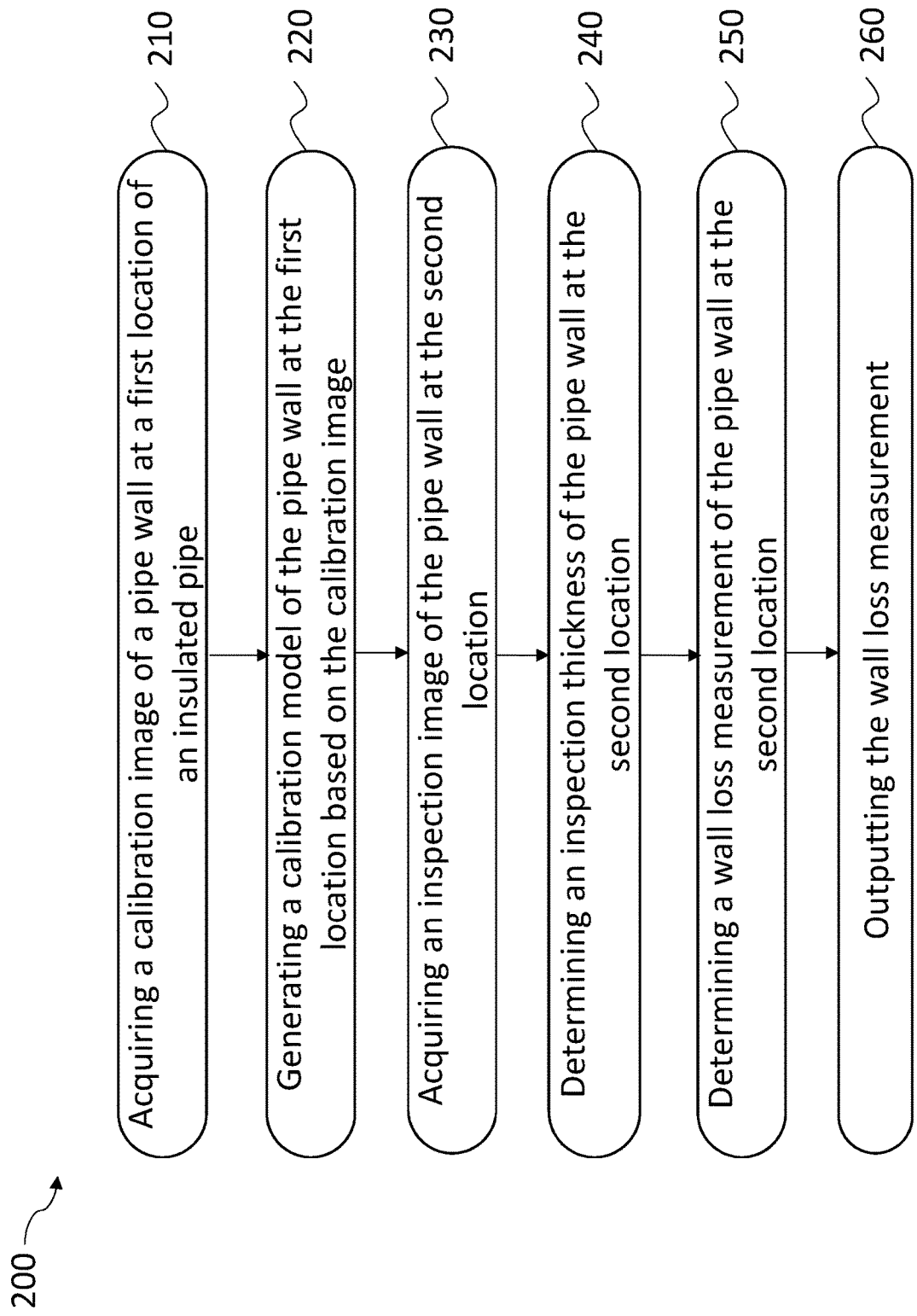
FIG. 2 is a process flow diagram illustrating an example process for inspecting an insulated pipe to determine an amount of corrosion and/or erosion in the pipe wall using the corrosion and erosion monitoring system of FIG. 1.

FIG. 2 is a process diagram illustrating an example process 200 performed by a corrosion and erosion monitoring and/or inspection system, such as the corrosion and erosion monitoring system 100 described in relation to FIG. 1 and configured to determine an amount of wall loss within an insulated pipe without requiring the insulation to be removed. The example process 200 described in FIG. 2, describes a process for inspecting an insulated pipe 105 to determine an amount of corrosion and/or erosion in the pipe wall using the corrosion and erosion monitoring system 100 of FIG. 1. The example process 200 described in FIG. 2 with regard to inspection operations will also be described in association with an example process 300, illustrated in FIG. 3, described with regard to calibration operations.

At operation 210, the modular acquisition system 125 acquires a calibration image of a pipe wall at a first location 115 of an insulated pipe 105. The management system 155 can cause the modular acquisition system 125 to acquire the calibration image in response to user input and/or one or more configuration settings triggering the modular acquisition system 125 to initiate calibration operations with respect to a new inspection to be performed. Calibration of the corrosion and erosion monitoring system 100 is important for determining an amount of CUI and necessary in order to calculate an amount of wall loss at a particular location of the insulated pipe 105 during an inspection operation. In response to initiating a calibration operation, the management system 155 can execute instructions causing the modular acquisition system 125 to emit radiation into the insulated pipe 105 and to cause the radiographic detector 145 to transmit the calibration image to the management system 155.

At operation 220, the management system 155 receives the calibration image and performs operations to generate a calibration model of the pipe 105 wall at the first location 115 based on the calibration image. In order to accurately determine the amount of corrosion and/or erosion and an amount of wall loss in the pipe 105, the management system 155 can utilize the calibration image acquired in operation 210 to generate a calibration model of the pipe 105. The calibration model can be a mathematical model or data structure that is used to determine a thickness of the pipe 105 wall in the calibration image. The calibration model can further include inputs of various properties of the pipe 105 and can be used by the management system 155 to determine geometric parity between the calibration image and subsequently acquired inspection images. By accounting for the geometric properties of the pipe 105, the determination of an amount of CUI or an amount of wall loss in the pipe 105 can be accurately determined between calibration images and inspection images. Further description of the calibration operations performed by the corrosion and erosion monitoring system 100 to generate the calibration model will now be described in relation to FIG. 3.

Figure 3:
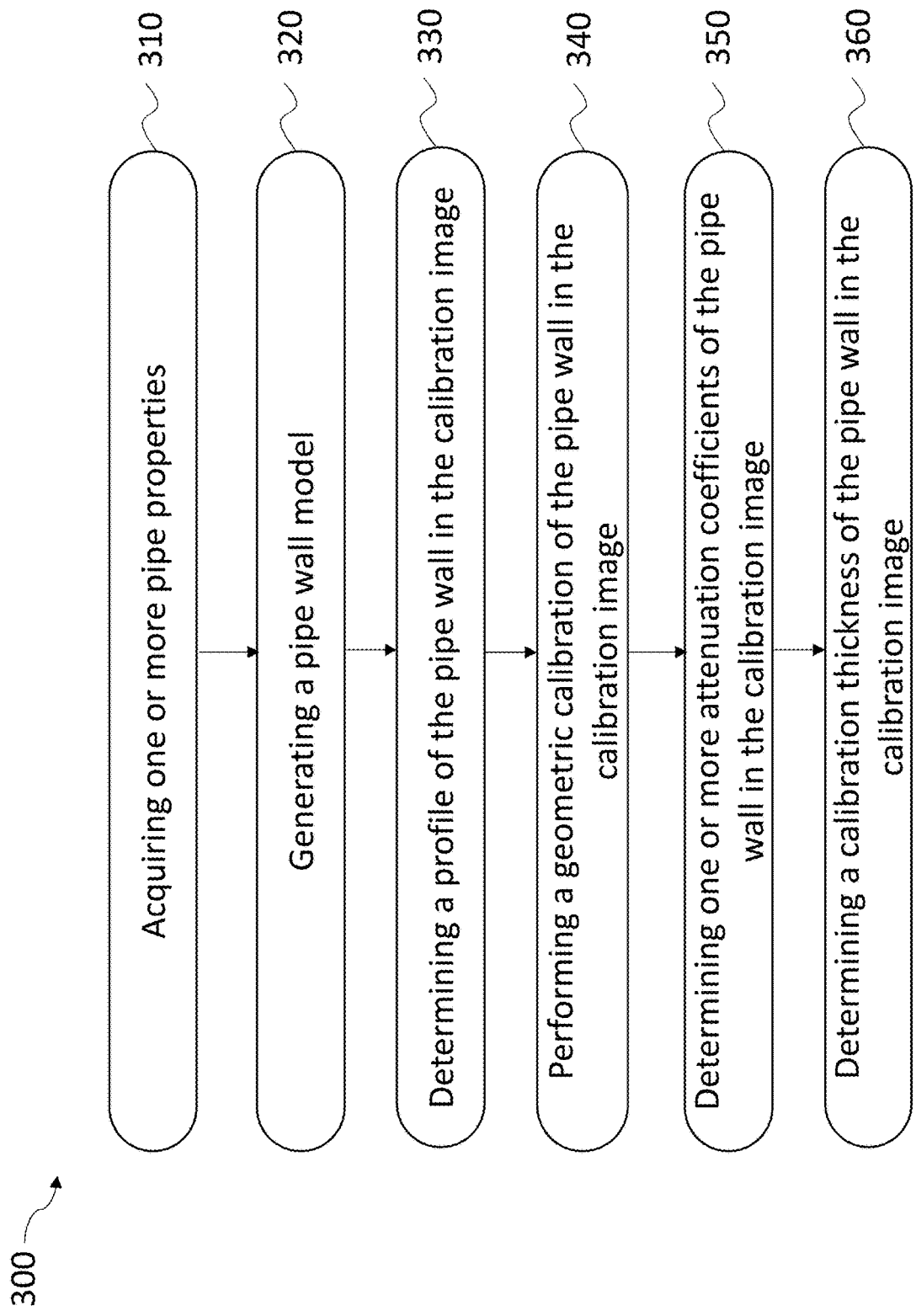
FIG. 3 is a process flow diagram illustrating an example process for calibrating the corrosion and erosion monitoring system of FIG. 1.

FIG. 3 is a process flow diagram illustrating an example process 300 for calibrating the corrosion and erosion monitoring system of FIG. 1 to generate a calibration model as described in relation to operation 220 of FIG. 2 in order to determine an amount of wall loss within an insulated pipe without requiring the insulation to be removed. The process 300 begins after a calibration image has been acquired as described in relation to operation 210 of FIG. 2. In operation 310 of FIG. 3, the management system 155 acquires one or more pipe properties. The one or more pipe properties can include, but are not limited to, a pipe inner diameter, a pipe outer diameter, a pipe material, a pipe insulation material, an insulation material thickness, and a presence of fluid in the pipe 105. The properties of pipe 105 can be provided to the management system 155 by a user, by a configuration setting associated with an inspection of a previous pipe 105 at the same location 115 or at a different location. In some embodiments, the pipe properties can be acquired based on GPS coordinate data associated with the location along the pipe 105 at which the calibration/inspection operations are occurring.

In operation 320, the management system 155 generates a pipe wall model. The pipe wall model can be a graphical model, an algorithmic model, a data structure, or the like representing the dimensional attributes of the pipe 105 and the insulation 110. The management system 155 constructs the pipe wall model based on the pipe properties acquired in operation 310 and uses the generated pipe wall model as a basis for subsequent calibration operations necessary to generate the calibration model that will be used to determine the CUI or amount of wall loss occurring in the pipe 105 using inspection image data. During operation 320, the management system 155 determines a thickness of the pipe, $t_1$, and the thickness of the insulation, $t_2$, at different radial distances along the circumference of the pipe 105 and the insulation 110.

In operation 330, the management system 155 determines a profile of the pipe wall in the calibration image. In order to identify the pipe 105 in the calibration image, the management system 155 generates multiple line profiles for the portion of the pipe 105 depicted in the calibration image. For example, the management system 155 generates line profiles associated with a left, right, and center perspective of the pipe 105 in the calibration image. In some embodiments, the management system 155 can generate line profiles for other perspectives of the pipe and is not limited to the left, right, and center perspectives. In some embodiments, the management system 155 can generate a continuous line profile. The management system 155 can then average the various line profiles to compute an average line profile for the pipe 105. Based on determining the minimum pixel intensity value at each end of the average line profile, the segment of pipe 105 that was imaged can be determined.

In operation 340, the management system 155 performs a geometric calibration of the pipe wall in the calibration image. The geometric calibration associates or scales the calibration image to the pipe wall model generated in operation 320. First, the management system 155 correlates points associated with the outer diameter of the pipe 105 in the calibration image to the actual dimensions in the pipe wall model. Next, the management system 155 computes linear interpolation coefficients for the pipe wall as a method of curve fitting. Finally, the management system 155 maps the intensity profile from the calibration image onto the pipe wall model.

In operation 350, the management system 155 determines one or more attenuation coefficients of the pipe wall in the calibration image. In some embodiments, the calibration model can include an attenuation coefficient associated with the pipe wall at the first location, and an attenuation coefficient of insulation at the first location. In some embodiments, the calibration models can include an attenuation coefficient for a fluid present within the pipe. The attenuation coefficients characterize the ease or difficulty for which a volume of material can be penetrated by the radiographic energy emitted from the radiographic source 140. Because the pipe 105 wall and the pipe insulation 110 can have different material properties, their attenuation coefficients can differ and thus be used to compute the thickness of the pipe wall and pipe insulation for subsequent use in determining CUI or an amount of material loss from within the pipe 105. The attenuation coefficients associated with the pipe wall and insulation can be determined using the Beer-Lambert law which states that the absorbance of a material is directly propositional to the thickness of the material. An example of computing the attenuation coefficient for the pipe wall is as follows.

Initially, the intensity values associated with the radiographic energy transmitted through the center of the pipe 105 and at the interface between the pipe 105 and the insulation 110 can be computed.

The intensity value of the radiographic energy transmitted through the center of the pipe can be determined using equation (1) shown below.

$$\frac{I}{I_0} = e^{-\mu_{eff} \cdot t_{tot}} \quad (1)$$

In equation (1), the ratio of the intensity of the radiographic energy after passing through the center of the pipe 105, I, and the intensity of the radiographic energy before passing through the center of the pipe 105, $I_0$, can be used to determine the effective attenuation coefficient, $\mu_{eff}$, and the total thickness of the pipe 105 including the insulation 110, $t_{tot}$.

Equation (1) can be further solved to determine the total thickness of the pipe 105 and the insulation 110, as shown in equation (2) below.

$$t_{tot} = 2t_1 + 2t_2 \quad (2)$$

The effective attenuation coefficient, $\mu_{eff}$, for the total thickness of the pipe 105, $t_{tot}$, can thus be represented in equation (3) below.

$$\mu_{eff} \cdot t_{tot} = \mu_1 \cdot 2t_1 + \mu_2 2t_2 \quad (3)$$

The effective attenuation coefficient, $\mu_{eff}$, can thus be determined for the radiographic energy passing through the center of the pipe 105 as shown in equation (4).

$$\mu_{eff} = \frac{\mu_1 \cdot 2t_1 + \mu_2 \cdot 2t_2}{(2t_1 + 2t_2)} \quad (4)$$

Applying the Beer-Lambert law in regard to the radiographic energy detected in the calibration image at the interface between the pipe 105 and the insulation 110, the attenuation coefficient for the pipe 105, $\mu_1$, and the attenuation coefficient for the insulation 110, $\mu_2$, can be similarly determined as shown in equations (5) and (6) below.

$$\mu_1 = \frac{\mu_{eff} \cdot t_{tot} - \mu_2 \cdot 2t_2}{(2t_1)} \quad (5)$$

$$\mu_2 = -\ln(I/I_0)/2t_2 \quad (6)$$

In operation 360, based on determining the attenuation coefficient, $\mu_1$, of the pipe 105 wall, the management system 155 determines a calibration thickness of the pipe wall in the calibration image. Once determined, the thickness of the pipe wall determined in the calibration image can be used to determine the thickness of the pipe wall in subsequent inspection images. Equations (7) and (8) below can be utilized to solve for the pipe 105 thickness, $t_1$.

$$\frac{I}{I_0} = e^{-\mu_{eff} \cdot t_{tot}} \quad (7)$$

$$\mu_{eff} \cdot t_{tot} = \ln I/I_0 \quad (8)$$

As a result, the pipe 105 thickness in the calibration image, $t_1$, can be solved as shown in equation (9) below.

$$t_1 = \frac{((\mu_{eff} \cdot t_{tot}) - (\mu_1 \cdot t_1))}{\mu_2} \quad (9)$$

Having completed the calibration process described in relation to operations 310-360 of FIG. 3, the management system 155 can continue operations to determine an amount of CUI or wall loss in pipe 105 during inspection operations described in relation to FIG. 2.

In operation 230, based on generating the calibration model of the pipe 105 wall and determining a thickness of the pipe 105 wall using the calibration image associated with the first location 115, the management system 155 can execute instructions, which when executed, cause the modular acquisition system 125 to acquire an inspection image of the pipe 105 wall at the second location 120. The modular acquisition system 125 acquires the inspection image in a similar manner as the calibration image was acquired and was described in operation 210 of FIG. 2. In operation 230, the radiographic source 140 emits radiographic energy into the pipe 105 and the insulation 110 that can be captured by the radiographic detector 145 as an inspection image. The radiographic detector 145 can transmit the inspection image to the management system 155 for use in determining an amount of corrosion and/or erosion present in the pipe 105 wall.

In operation 240, the management system 155 receives the transmitted inspection image and determines an inspection thickness of the pipe 105 wall at the second location 120. The management system 155 determines the inspection thickness of the pipe 105 wall at the second location based on completing operations 330-360 described in FIG. 3 but as applied to the inspection image acquired during operation 230 of an inspection operation. As a result, the management system 155 can determine the inspection thickness of the pipe 105 wall using equation (9) above but now applied to the intensity values associated with the inspection image.

In operation 250, the management system 155 can determine a wall loss measurement of the pipe 105 wall at the second location 120. Having computed the wall thickness, $t_1$, for the inspection image, the measure of wall loss can be determined as the difference of the wall thickness determined in relation to the calibration image acquired during the calibration operation and the wall thickness determined in relation to the inspection image acquired during the inspection operation.

In operation 260, the management system 155 outputs the wall loss measurement. For example, the management system 155 can output the wall loss measurements to one or more software applications configured to provide visualization and repair functionality. The wall loss measurements can be output for display, such as on display 160 and can be provided to users as a color map with appropriate coloring or shading to indicate where changes in the thickness of the pipe wall may be present at the second location 120. The color map generated by the management system 155 can represent an improved graphical user interface for presenting an amount of CUI and/or an amount of wall loss within a pipe because the color map provides a novel, intuitive, easy-to-interpret presentation of the wall loss data acquired during an inspection of an insulated pipe.

FIGS. 4A-4H illustrate an exemplary implementation of performing calibration and inspection operations on an insulated pipe using the corrosion and erosion monitoring system of FIG. 1 according to one or more of the methods described in relation to FIGS. 2 and 3.

Figure 4A:
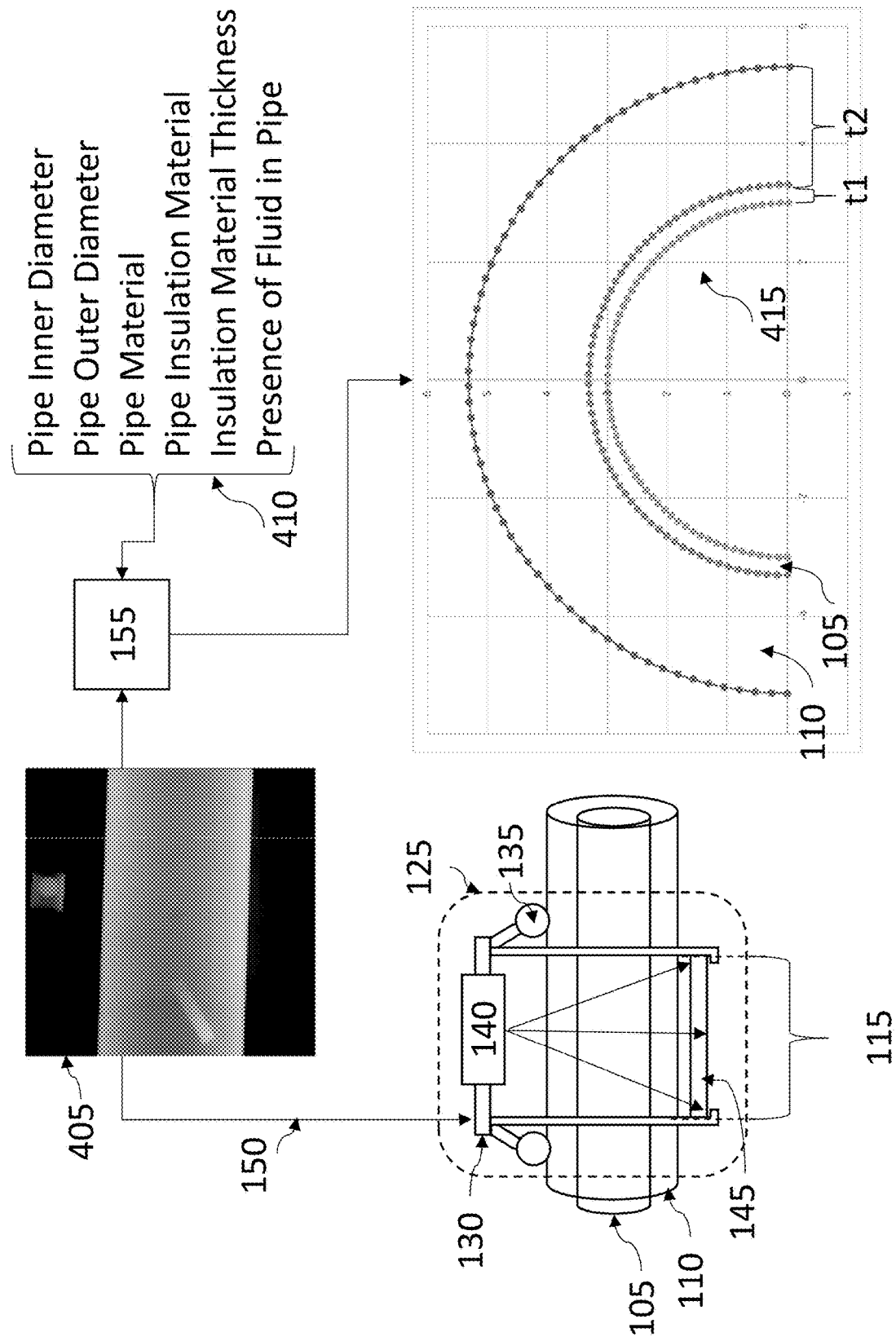
FIGS. 4A-4H illustrate an exemplary embodiment of performing calibration and inspection operations on an insulated pipe using the corrosion and erosion monitoring system of FIG. 1 according the methods of FIGS. 2 and 3.

As shown in FIG. 4A, the modular acquisition system 125 is positioned at a first location 115 with respect to the pipe 105 that is covered by insulation 110 and acquires a calibration image 405 at the first location according to operation 210 described in relation to FIG. 2. The radiographic source 140 emits radiographic energy through the pipe 105 and the insulation 110 which is received by radiographic detector 145. A digital image, the calibration image 405, is transmitted from the modular acquisition system 125, via communications interface 150, to the management system 155. The calibration image 405 includes GPS coordinate data corresponding to the first location 115.

The management system 155 can then commence calibration operations to generate a calibration model of the pipe 105 wall by acquiring one or more pipe properties 410 according to operation 310 described in relation to FIG. 3. The management system 155 can generate a pipe wall model 415 according to operation 320 described in relation to FIG. 3. The pipe wall model 415 can include measurements of the thickness of the pipe 105, e.g., $t_1$, and measurements of the thickness of the insulation 110, e.g., $t_2$. The thickness measurements can be determined at different radial distances extending around the circumference of the pipe 105 and the insulation 110.

Figure 4B:
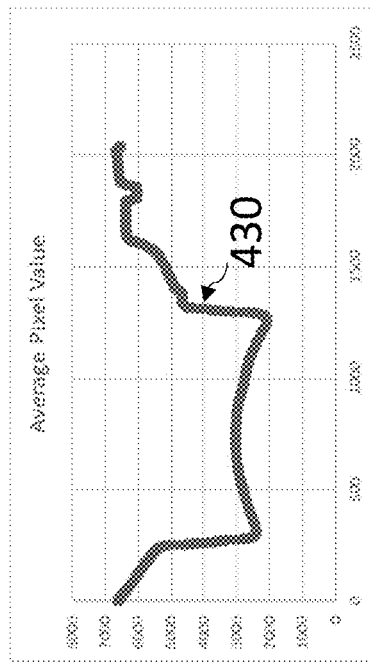
Figure 4C:
Figure 4D:
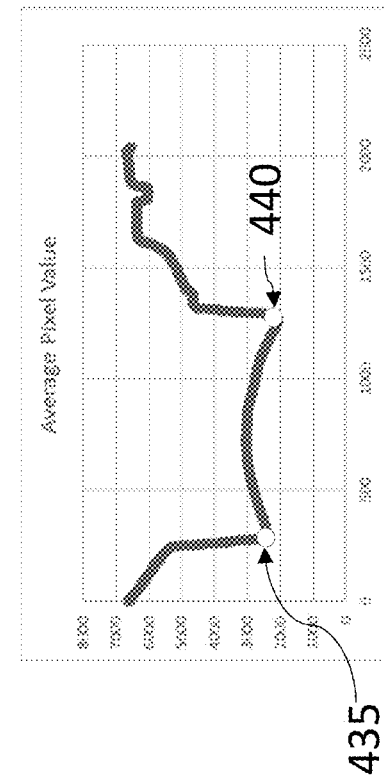

As shown in FIGS. 4B-4D, the management system 155 determines a profile of the pipe wall in the calibration image according to operation 330 described in relation to FIG. 3. The intensity values associated with the pixels in the calibration image 405 are used to generate line profiles corresponding to different aspects from which the radiographic energy was emitted by the radiographic source 140 and transmitted through the pipe 105 and insulation 110. For example, line profile 415 can be associated with the left aspect of the calibration image 405, line profile 420 can be associated with the right aspect of the calibration image 405, and line profile 425 can be associated with the central aspect of the calibration image 405. As shown in FIG. 4C, the management system 155 can compute an average line profile 430 based on the three different line profiles descried in relation to FIG. 4B. In FIG. 4D, the management system 155 completes the determination of the pipe wall profile in the calibration image by determining the minimum intensity values present at each end of the average line profile. As shown in FIG. 4D, the management system determines that points 435 and 440 correspond to the minimum intensity values and can thereby be used to identify a portion or segment of the pipe 105.

Figure 4E:
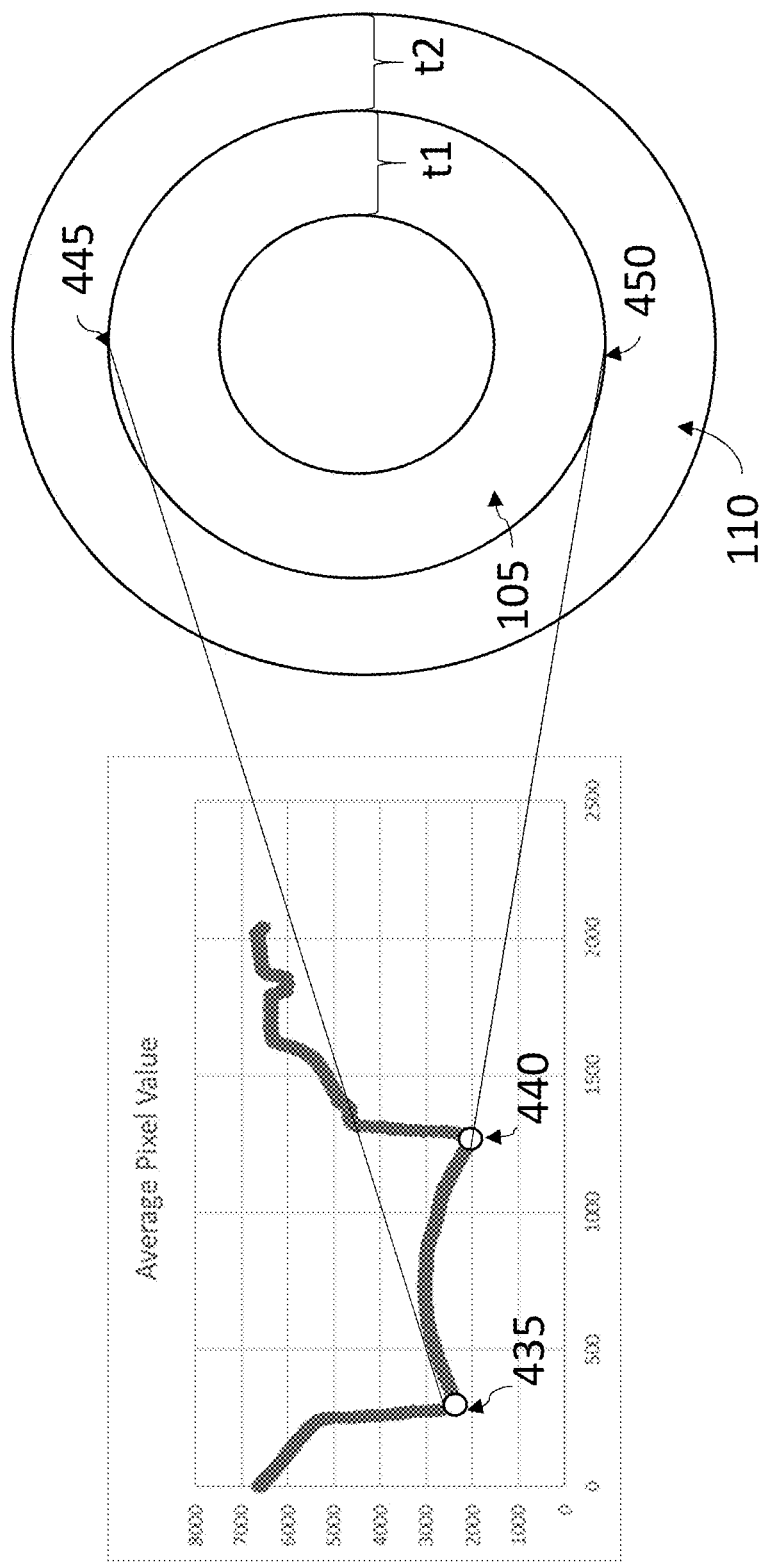

In FIG. 4E, the management system 155 performs a geometric calibration of the pipe wall in the calibration image 405 according to operation 340 described in relation to FIG. 3. The geometric calibration associates the minimum intensity values 435 and 440 from the calibration image 405 to actual dimensions 445 and 450, respectively. The management system 155 can further determine linear interpolation coefficients such that the thicknesses of the pipe 105, $t_1$, and the insulation, $t_2$, can be determined by mapping or curve fitting the pixel value intensity profiles over the calibration model of the pipe 105 and the insulation 110.

Figure 4F:
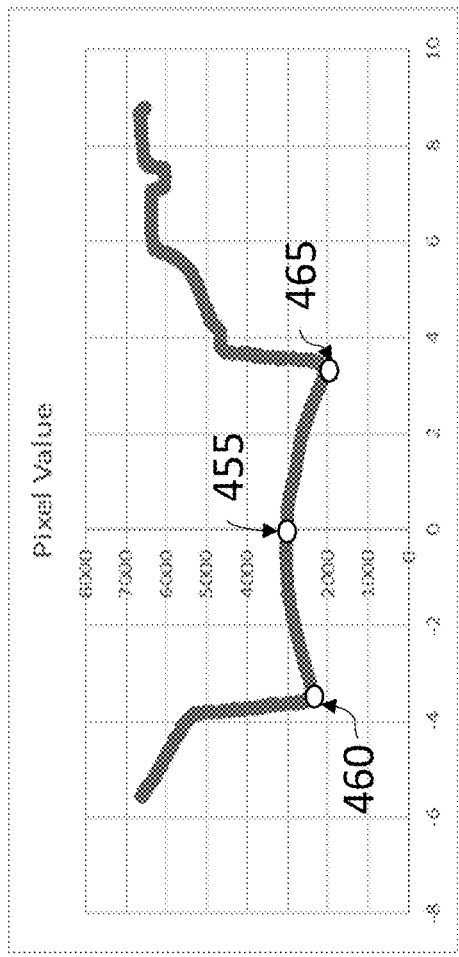

In FIG. 4F, the management system 155 can determine one or more attention coefficients of the pipe wall in the calibration image 405 according to operation 350 described in relation to FIG. 3. As shown in FIG. 4F, the management system 155 determines the pixel intensity value 455 at the center of the pipe and also the pixel intensity values 460 and 465 which are associated with the interface between the pipe 105 and the insulation 110. The pixel intensity values can be used to determine the one or more attenuation coefficients based on the correlation between the magnitude of the pixel intensity value and the intensity of the radiographic energy transmitted through the pipe 105 and the insulation 110.

Figure 4G:
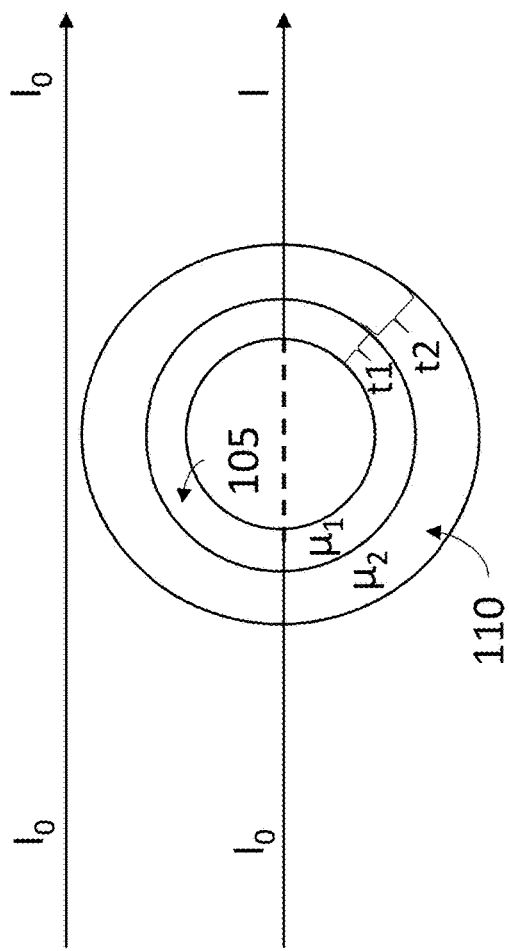

In FIG. 4G, the management system 155 can compute the attenuation coefficients of the pipe 105 (e.g., $\mu_1$) and the insulation 110 (e.g., $\mu_2$) by utilizing the Beer-Lambert law described in relation to operation 350 of FIG. 3. Using the Beer-Lambert law, the intensity of the radiographic energy that is applied to the pipe 105 ($I_0$) can be evaluated with respect to the intensity of the radiographic energy that passes through the pipe 105 (I) such that the attenuation coefficients for the pipe 105 (e.g., $\mu_1$) and the insulation 110 (e.g., $\mu_2$) can be determined using the previously described equations (5) and (6). As a result of determining the attenuation coefficients for the pipe 105 and the insulation 110, the management system 155 can determine a calibration thickness of the pipe wall (e.g., $t_1$) based on the calibration image according to operation 360 as described in relation to FIG. 3 and using the previously described equation (9).

Figure 4H:
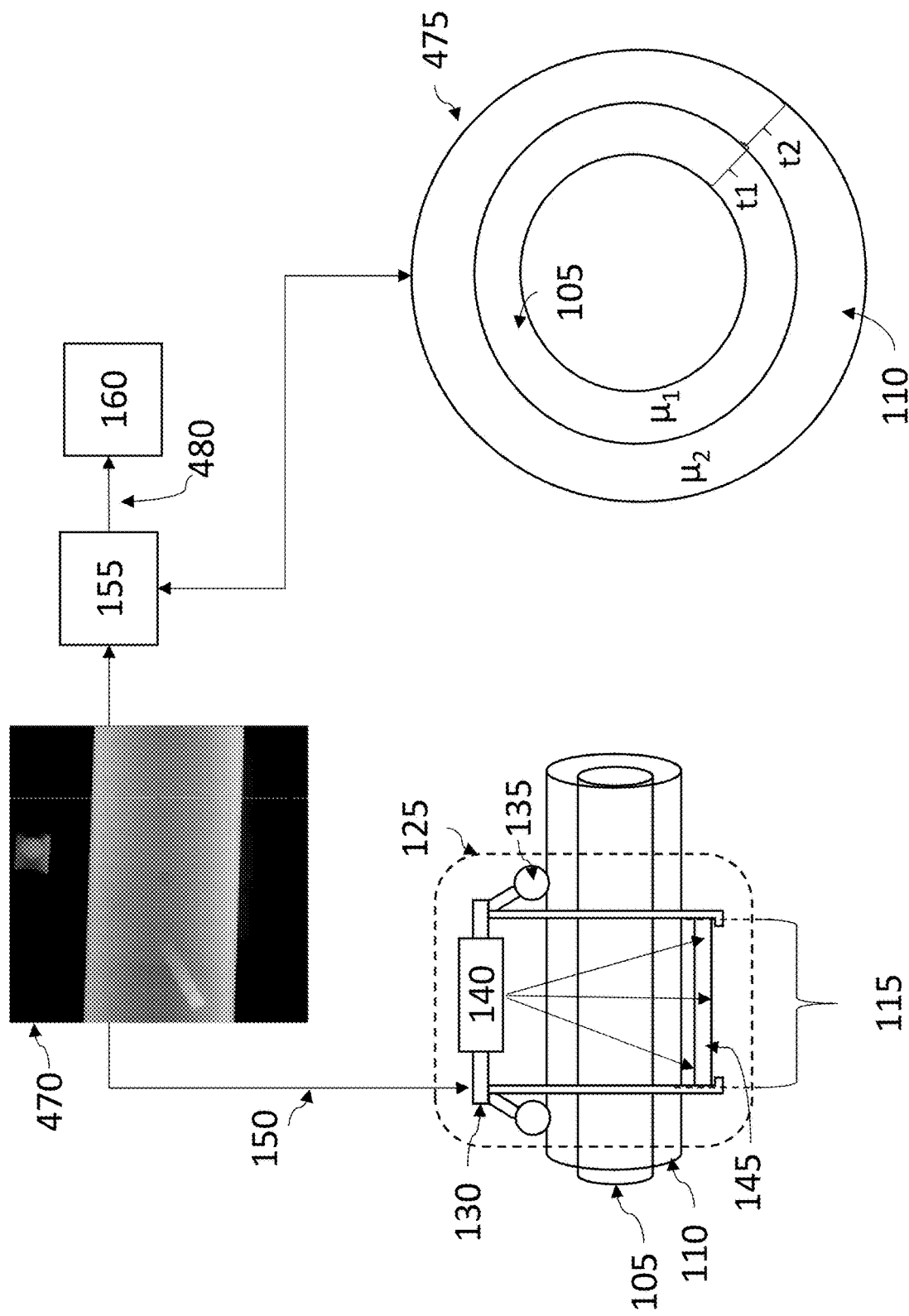

As shown in FIG. 4H, having completed the calibration operations, the management system 155 can execute instructions causing the modular acquisition system 125 to acquire an inspection image 470 of the pipe 105 and the insulation 110 at the second location 120 according to operation 230 described in relation to FIG. 2. The inspection image 470 is transmitted via communications interface 150 to the management system 155. The management system 155 can then determine an inspection thickness according to operation 240 described in relation to FIG. 2. The inspection thickness (e.g., $t_1$ and $t_2$ shown in 475) can be determined in a manner analogous to operations 330-360 described in relation to FIG. 3, except the geometric calibration, the one or more attenuation coefficients, and the thickness of the pipe are determined with respect to the inspection image 470. A wall loss measurement can be computed based on the inspection image 470 according to operation 250 described in relation to FIG. 2. The wall loss measurement can be determined as a difference in the calibration thickness of the pipe 105 and the inspection thickness of the pipe 105. As further shown in FIG. 4H, the management system 155 can output 480 the wall loss measurement for display.

The corrosion and erosion monitoring system 100 can continue to acquire inspection images and determine wall loss measurements at other locations along the same portion of pipe which included the first and second locations. In some embodiments, the corrosion and erosion monitoring system 100 can be redeployed to or reconfigured on a different portion of pipe. The new portion of pipe can include a third location which is different than the first and second locations. In some embodiments, the corrosion and erosion monitoring system 100 can cause the modular acquisition device 125 to be repositioned based on determining a change in the wall loss measurement at the third location 120 as compared to the second location. In this example, the management system 155 can reposition the modular acquisition device 125 to initiate calibration operations at the third location and subsequently perform inspection operations at a fourth location. The fourth location different than the third location and included in a different portion of pipe than the first and second locations. In this way, the corrosion and erosion monitoring system 100 can perform inspections along portions of an insulated pipe in an automated manner without requiring manual intervention or operator assistance to recalibrate the modular acquisition system 125 for subsequent inspection operations at different locations along the length of the pipe.

Figure 5:
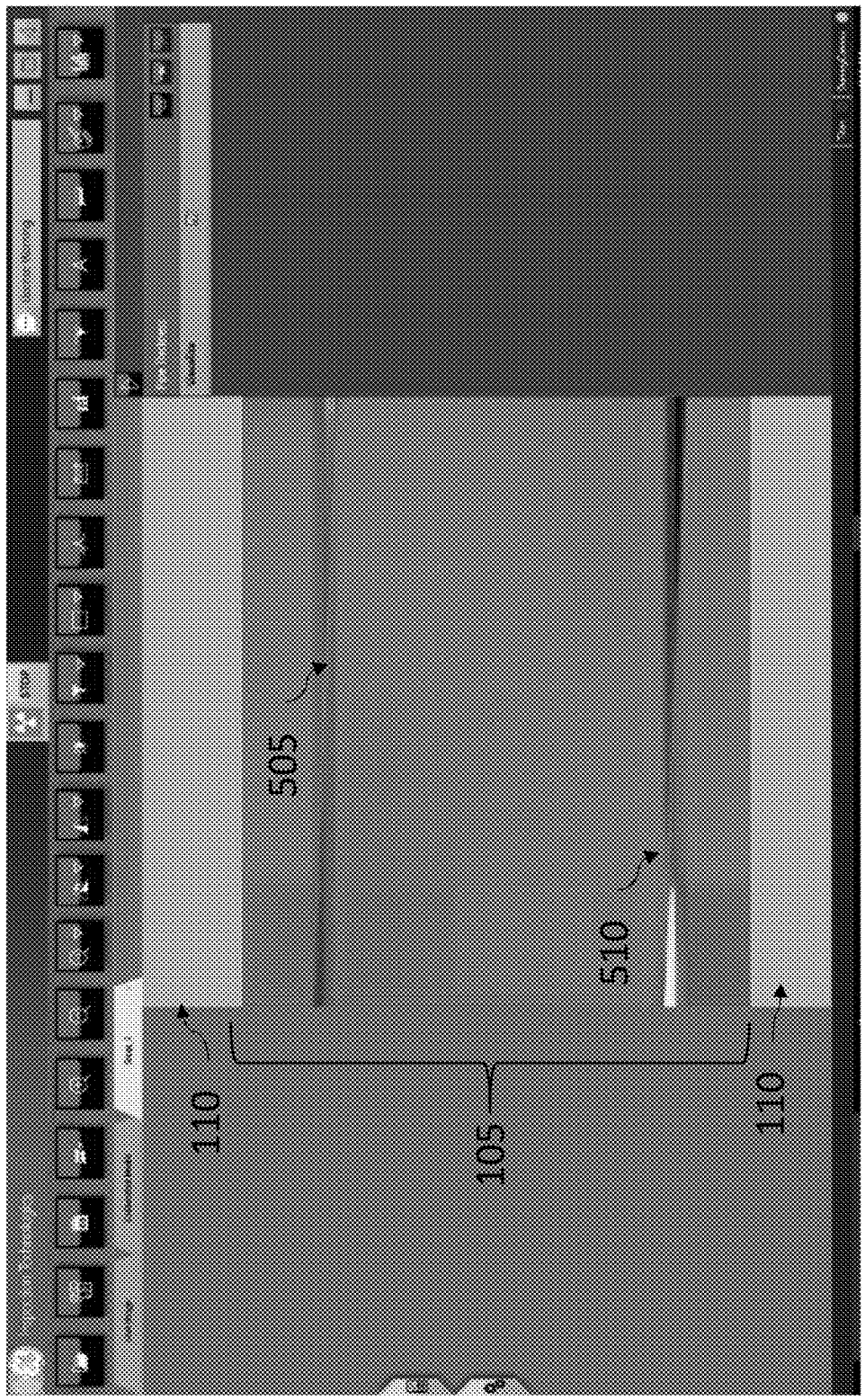
FIG. 5 depicts an exemplary graphical user interface displaying an amount of corrosion and/or erosion in an insulated pipe as output by the corrosion and erosion monitoring system of FIG. 1.

FIG. 5 is an exemplary graphical user interface (GUI) 500 displaying an amount of corrosion and/or erosion in an insulated pipe as output by the corrosion and erosion monitoring system 100 of FIG. 1. The GUI 500 shown in FIG. 5 can be a GUI displayed within one or more applications which can configured on the management system 155 to provide visualization and repair functionality. In some embodiments, the applications can be configured on the same computing device as the management system 155. In some embodiments, the applications can be configured in a web-browser on a computing device that is connected to the management system 155 but located remotely from the management system 155. In some embodiments, the applications can be configured to generate a three-dimensional CAD model depicting one or more pipes within an oil and gas production facility and the GUI 500 can include functionality allowing a user to navigate, zoom in or out, highlight or select, aspects of the pipe 105 displayed within the GUI 500.

As shown in FIG. 5, the GUI 500 displays a horizontal cross-section of a pipe 105 and the insulation 110. The GUI 500 displays the wall loss measurements determined at the upper 505 and lower 510 portions of the walls of pipe 105 as a color map that is provided in the GUI as a visualization layer or graphical overlay atop the inspection image, such as inspection image 470 of FIG. 4H. In some embodiments, the GUI 500 can be displayed as a visualization layer or graphical overlay atop a three-dimensional CAD model depicting one or more pipes 105 associated with an oil and gas production facility at which the inspection operations were performed.

The GUI 500 improves the operation of a computing device to visualize wall loss measurements due to corrosion and/or erosion in an insulated pipe as an intuitive color map that can be automatically generated during an inspection operation. Without the color map, viewing the subtle variations in the pipe dimensions as a result of corrosion and/or erosion within the pipe 105 would be very difficult to interpret accurately in order to properly diagnose corrosion and/or erosion conditions and organize repair of the corrosion and/or erosion within the pipe 105. Thus, the GUI 500 can be integrated into the practical application of determining an amount of wall loss within an insulated pipe using digital radiography at a plurality of locations along the length of the insulated pipe. The GUI 500 enhances this application by automatically generating inspection images and updating the color map displayed in the GUI 500 in an automated manner with respect to the inspection images.

Figure 6:
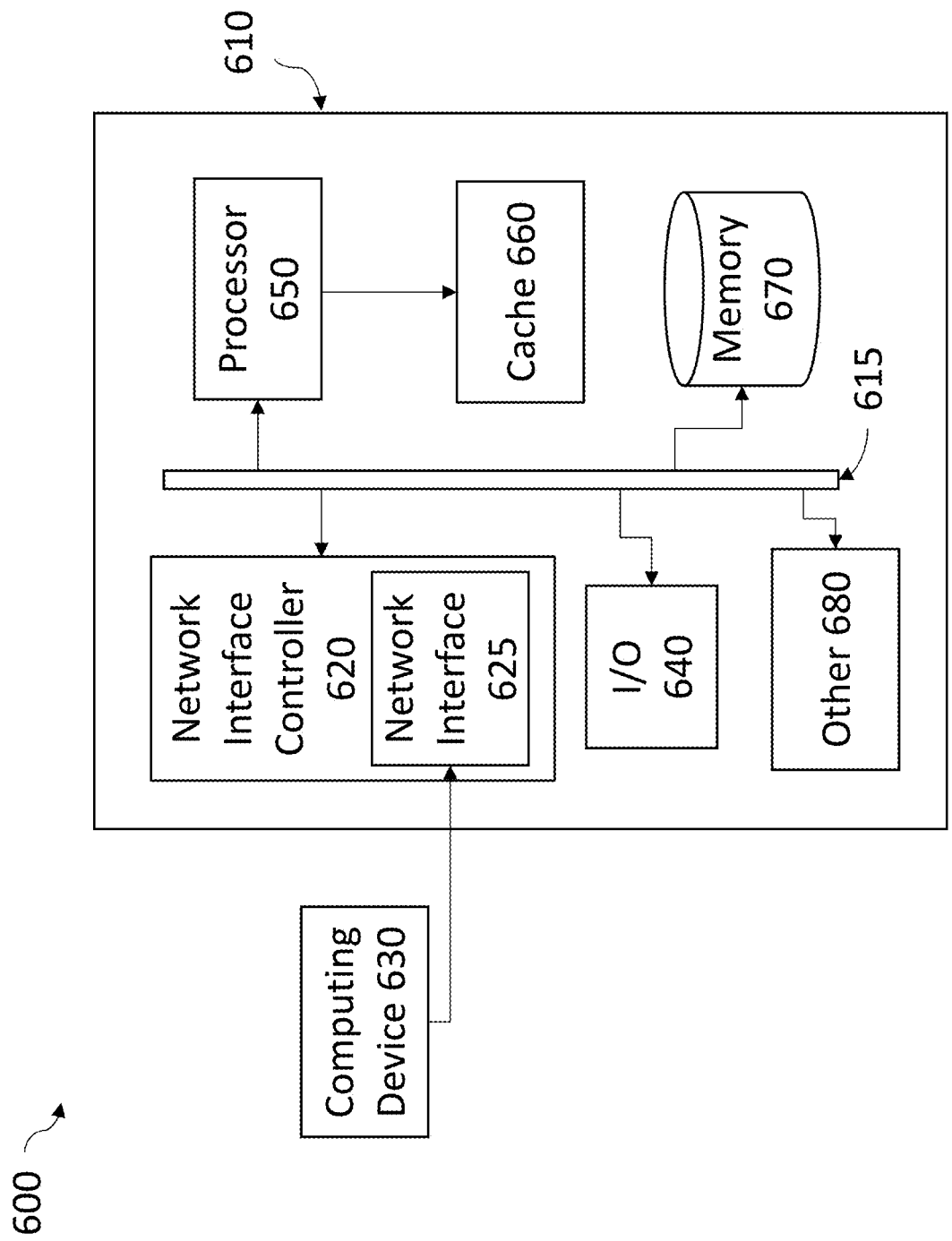
FIG. 6 is a block diagram of an exemplary computing system in accordance with an illustrative implementation of the corrosion and erosion monitoring system of FIG. 1.

FIG. 6 is a block diagram of a computing system 610 suitable for use in implementing the computerized components described herein. In broad overview, the computing system 610 includes at least one processor 650 for performing actions in accordance with instructions, and one or more memory devices 660 and/or 670 for storing instructions and data. The illustrated example computing system 610 includes one or more processors 650 in communication, via a bus 615, with memory 670 and with at least one network interface controller 620 with a network interface 625 for connecting to external devices 630, e.g., a computing device (such as a controller or a modular acquisition system). The one or more processors 650 are also in communication, via the bus 615, with each other and with any I/O devices at one or more I/O interfaces 640, and any other devices 680. The processor 650 illustrated incorporates, or is directly connected to, cache memory 660. Generally, a processor will execute instructions received from memory. In some embodiments, the computing system 610 can be configured within a cloud computing environment, a virtual or containerized computing environment, and/or a web-based microservices environment.

In more detail, the processor 650 can be any logic circuitry that processes instructions, e.g., instructions fetched from the memory 670 or cache 660. In many embodiments, the processor 650 is an embedded processor, a microprocessor unit or special purpose processor. The computing system 610 can be based on any processor, e.g., suitable digital signal processor (DSP), or set of processors, capable of operating as described herein. In some embodiments, the processor 650 can be a single core or multi-core processor. In some embodiments, the processor 650 can be composed of multiple processors.

The memory 670 can be any device suitable for storing computer readable data. The memory 670 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 610 can have any number of memory devices 670.

The cache memory 660 is generally a form of high-speed computer memory placed in close proximity to the processor 650 for fast read/write times. In some implementations, the cache memory 660 is part of, or on the same chip as, the processor 650.

The network interface controller 720 manages data exchanges via the network interface 625. The network interface controller 620 handles the physical and data link layers of the Open Systems Interconnect (OSI) model for network communication. In some implementations, some of the network interface controller's tasks are handled by the processor 650. In some implementations, the network interface controller 620 is part of the processor 650. In some implementations, a computing device 610 has multiple network interface controllers 620. In some implementations, the network interface 625 is a connection point for a physical network link, e.g., an RJ 45 connector. In some implementations, the network interface controller 620 supports wireless network connections and an interface port 625 is a wireless receiver/transmitter. Generally, a computing device 610 exchanges data with other network devices 630, such as computing device 630, via physical or wireless links to a network interface 625. In some implementations, the network interface controller 620 implements a network protocol such as Ethernet.

The other computing devices 630 are connected to the computing device 610 via a network interface port 625. The other computing device 630 can be a peer computing device, a network device, or any other computing device with network functionality. For example, a computing device 630 can be a controller, a modular acquisition system, and/or a management system as configured within the corrosion monitoring system illustrated in FIG. 1. In some embodiments, the computing device 630 can be a network device such as a hub, a bridge, a switch, or a router, connecting the computing device 610 to a data network such as the Internet.

In some uses, the I/O interface 640 supports an input device and/or an output device (not shown). In some uses, the input device and the output device are integrated into the same hardware, e.g., as in a touch screen. In some uses, such as in a server context, there is no I/O interface 640 or the I/O interface 640 is not used. In some uses, additional other components 780 are in communication with the computer system 610, e.g., external devices connected via a universal serial bus (USB).

The other devices 680 can include an I/O interface 640, external serial device ports, and any additional co-processors. For example, a computing system 610 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 610, e.g., a touch screen on a tablet device. In some implementations, a computing device 610 includes an additional device 680 such as a co-processor, e.g., a math co-processor that can assist the processor 650 with high precision or complex calculations.

Without in any way limiting the scope, interpretation, or application of the claims appearing below, a technical effect of one or more of the example implementations disclosed herein may include, for example, by utilizing digital radiography and a corrosion and erosion monitoring system including a mobile, modular acquisition system, some implementations of the current subject matter can enable more accurate detection and remediation of corrosion and/or erosion or wall loss within an insulated pipe at one or more locations of a pipe within an operational pipeline. Some implementations of the current subject matter can enable the corrosion and erosion monitoring system to perform calibration and inspection operations at multiple locations along the length of an insulated pipe, without requiring the insulation of the pipe to be removed during inspection and without removing the modular acquisition system from the pipe entirely for redeployment at subsequent locations. As compared to some conventional systems, some implementations of the current subject matter can enable corrosion and/or erosion monitoring, inspection, and repair operations or solutions that may be less expensive; require fewer resources, and are less disruptive to pipeline production operations. Further, some implementations of the current subject matter can enable rapidly inspecting and diagnosing corrosion and/or erosion conditions within a pipe as a result of the automated calibration and inspection operations that the corrosion and erosion monitoring system is configured to perform. Some implementations of the current subject matter can also improve the safety of inspection and repair operations as a result of displaying accurate location information and corrosion and/or erosion data, via the GUI configured within one or more applications including visualization and repair functionality, prior to the inspection and repair operations.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
acquiring a calibration image of a pipe wall at a first location of an insulated pipe;
acquiring an inspection image of the pipe wall at a second location of the insulated pipe, the second location different than the first location;
determining an inspection thickness of the pipe wall at the second location;
determining a wall loss measurement of the pipe wall at the second location, the wall loss measurement determined based on a difference of a calibration thickness of the pipe wall at the first location and the determined inspection thickness, the wall loss measurement characterizing an amount of wall loss in the insulated pipe at the second location; and
outputting the wall loss measurement.

2. The method of claim 1, further comprising,
generating a calibration model of the pipe wall at the first location based on the calibration image, the calibration model including an attenuation coefficient associated with the pipe wall at the first location, an attenuation coefficient of insulation at the first location, and the calibration thickness of the pipe wall at the first location in the calibration image; and
determining the inspection thickness of the pipe wall at the second location based on applying the attenuation coefficient associated with the pipe wall at the first location and the attenuation coefficient of insulation at the first location to the inspection image.

3. The method of claim 1, wherein the acquiring steps are performed by a modular acquisition system including a radiographic source, a radiographic detector, and a crawler device including a processor, a controller, and a plurality of positioning mechanisms configured to position the radiographic source and the radiographic detector at one or more locations along the length of the pipe.

4. The method of claim 3, wherein the generating, determining, and outputting steps are performed by a processing system coupled to the acquisition system, the processing system being further coupled to a management system including computer-readable executable instructions, which when executed provide one or more applications configured with visualization and repair functionality associated with one or more pipes in an oil and gas production facility for which an amount of wall loss has been determined.

5. The method of claim 4, wherein outputting the wall loss measurement includes providing the wall loss measurement in a display of the processing system as a color map atop the inspection image of one or more pipes configured within an oil and gas production facility.

6. The method of claim 4, wherein outputting the wall loss measurement includes transmitting the wall loss measurement to the management system and providing, by the management system, the wall loss measurement for display within the one or more applications configured with visualization and repair functionality.

7. The method of claim 6, wherein the management system displays one or more wall lost measurements in a graphical overlay atop a three-dimensional computer-aided design model depicting one or more pipes associated with an oil and gas production facility.

8. The method of claim 1, wherein the calibration image acquired at the first location and the inspection image acquired at the second location respectively include global positioning system coordinate data corresponding to the pipe wall at the first and second locations.

9. The method of claim 1, further comprising, in response to determining the wall loss measurement is indicative of a difference of pipe wall thickness at a third location as compared to the second location, wherein the third location is different than the second location, automatically acquiring an inspection image of a pipe wall at a fourth location and subsequently performing operations including
acquiring a calibration image of a pipe wall at the third location of an insulated pipe;
acquiring an inspection image of the pipe wall at the fourth location, the fourth location different than the third location;
determining an inspection thickness of the pipe wall at the fourth location;
determining a wall loss measurement of the pipe wall at the fourth location, the wall loss measurement determined based on a difference of a calibration thickness of the pipe wall at the third location and the determined inspection thickness, the wall loss measurement characterizing an amount of wall loss in the insulated pipe at the fourth location; and
outputting the wall loss measurement of the pipe wall at the fourth location.

10. The method of claim 9, further comprising,
generating a calibration model of the pipe wall at the third location based on the calibration image, the calibration model including an attenuation coefficient associated with the pipe wall at the third location, an attenuation coefficient of insulation at the third location, and the calibration thickness of the pipe wall at the third location; and
determining the inspection thickness of the pipe wall at the fourth location based on applying the attenuation coefficient associated with the pipe wall at the third location and the attenuation coefficient of insulation at the third location to the inspection image.

11. The method of claim 1, wherein generating the calibration model further comprises:
acquiring one or more pipe properties;
generating a pipe wall model;
determining a profile of the pipe wall in the calibration image;
performing a geometric calibration of the pipe wall in the calibration image based on the pipe wall model;
determining an attenuation coefficient of the pipe wall in the calibration image; and
determining a calibration thickness of the pipe wall in the calibration image.

12. The method of claim 11, wherein the one or more pipe properties include a pipe inner diameter, a pipe outer diameter, a pipe material, a pipe insulation material, a pipe insulation material thickness, and a presence of a fluid within the pipe.

13. A system comprising:
a memory; and
a processor, coupled to the memory, the processor configured to perform operations including
acquiring a calibration image of a pipe wall at a first location of an insulated pipe;
acquiring an inspection image of the pipe wall at a second location of the insulated pipe, the second location different than the first location;
determining an inspection thickness of the pipe wall at the second location;
determining a wall loss measurement of the pipe wall at the second location, the wall loss measurement determined based on a difference of a calibration thickness of the pipe wall at the first location and the determined inspection thickness, the wall loss measurement characterizing an amount of wall loss in the insulated pipe at the second location; and
outputting the wall loss measurement.

14. The system of claim 13, wherein the processor is further configured to perform operations including
generating a calibration model of the pipe wall at the first location based on the calibration image, the calibration model including an attenuation coefficient associated with the pipe wall at the first location, an attenuation coefficient of insulation at the first location, and the calibration thickness of the pipe wall at the first location in the calibration image; and
determining the inspection thickness of the pipe wall at the second location based on applying the attenuation coefficient associated with the pipe wall at the first location and the attenuation coefficient of insulation at the first location to the inspection image.

15. The system of claim 13, further comprising a modular acquisition system coupled to the processor, the modular acquisition system including a radiographic source, a radiographic detector, and a crawler device including a processor, a controller, and a plurality of positioning mechanisms configured to position the radiographic source and the radiographic detector at one or more locations along the length of the pipe, the modular acquisition system configured to acquire the calibration image at the first location of the insulated pipe and to acquire the inspection image at the second location of the insulated pipe.

16. The system of claim 15, wherein the processor is coupled to the modular acquisition system by a wired or wireless communications interface.

17. The system of claim 15, wherein the modular acquisition system includes a global positioning system configured to generate global positioning system coordinate data and the calibration image acquired at the first location and the inspection image acquired at the second location respectively include the global positioning system coordinate data corresponding to the pipe wall at the first and second locations.

18. The system of claim 13, wherein outputting the wall loss measurement for display includes providing the wall loss measurement in a display, coupled to the processor, as a color map atop the inspection image of one or more insulated pipes associated with an oil and gas production facility.

19. The system of claim 13, further comprising a management system, coupled to the processor, the management system including computer-readable executable instructions, which when executed provide one or more applications configured with visualization and repair functionality associated with one or more pipes in an oil and gas production facility for which an amount of wall loss has been determined.

20. The system of claim 19, wherein the one or more applications configured with visualization and repair functionality are further configured to
receive the wall loss measurement output from the processor, and
provide the wall loss measurement for display in an interactive graphical user interface.

21. The system of claim 19, wherein the management system displays one or more wall lost measurements in a graphical overlay atop a three-dimensional computer-aided design model depicting one or more pipes associated with an oil and gas production facility.

22. The system of claim 13, wherein the processor is further configured to perform operations, in response to determining the wall loss measurement at the second location, including
acquiring an inspection image of the pipe wall at a third location, the third location different than the second location;
determining an inspection thickness of the pipe wall at the third location;
determining a wall loss measurement of the pipe wall at the third location, the wall loss measurement determined based on a difference of a calibration thickness of the pipe wall at the first location and the determined inspection thickness of the pipe wall at the third location, the wall loss measurement characterizing an amount of wall loss in the insulated pipe at the third location; and
outputting the wall loss measurement of the pipe wall.

23. The system of claim 22, wherein the processor is further configured to perform operations including
generating a calibration model of the pipe wall at the first location based on the calibration image, the calibration model including an attenuation coefficient associated with the pipe wall at the first location, an attenuation coefficient of insulation at the first location, and the calibration thickness of the pipe wall at the first location in the calibration image; and
determining the inspection thickness of the pipe wall at the third location based on applying the attenuation coefficient associated with the pipe wall at the first location and the attenuation coefficient of insulation at the first location to the inspection image of the pipe wall at the third location.

24. A machine readable storage medium containing program instructions, which when executed cause one or more processors to perform the method of:
acquiring a calibration image of a pipe wall at a first location of an insulated pipe;
generating a calibration model of the pipe wall at the first location based on the calibration image, the calibration model including an attenuation coefficient and a calibration thickness of the pipe wall at the first location in the calibration image;
acquiring an inspection image of the pipe wall at a second location;
determining an inspection thickness of the pipe wall at the second location based on applying the attenuation coefficient to the inspection image;
determining a wall loss measurement of the pipe wall at the second location, the wall loss measurement determined based on a difference of the calibration thickness and the determined inspection thickness, the wall loss measurement characterizing an amount of wall loss in the insulated pipe at the second location; and
outputting the wall loss measurement.

* * * * *